J. D. TILLMAN.
LAWN MOWER.
APPLICATION FILED NOV. 24, 1915.

1,182,117.

Patented May 9, 1916.
2 SHEETS—SHEET 1.

Adelaide Kearns,
Draftsman.

Inventor:
John Deo Tillman,
By Robert W. Landle,
Attorney.

J. D. TILLMAN.
LAWN MOWER.
APPLICATION FILED NOV. 24, 1915.

1,182,117.

Patented May 9, 1916.
2 SHEETS—SHEET 2.

Adelaide Kearns,
Draftsman.

Inventor:
John Deo Tillman;
By Robert W. Lautte
Attorney.

UNITED STATES PATENT OFFICE.

JOHN DEO TILLMAN, OF RICHMOND, INDIANA.

LAWN-MOWER.

1,182,117.   Specification of Letters Patent.   Patented May 9, 1916.

Application filed November 24, 1915. Serial No. 63,329.

*To all whom it may concern:*

Be it known that I, JOHN DEO TILLMAN, a citizen of the United States, and a resident of the city of Richmond, in the county of Wayne and State of Indiana, have invented new and useful Improvements in Lawn-Mowers, of which the following is a full, clear, and comprehensive specification and exposition, the same being such as will enable others to make and use the same with precision.

The object of my present invention is to provide certain new and useful improvements in the construction of lawn mowers over that set forth in Letters Patent No. 1,134,650, issued to me under date of April 6, 1915, the same to be used in connection with the construction set forth in said patent, or to be employed entirely distinct and separate therefrom as desired.

The particular objects of my present invention are to provide, in connection with lawn mowers or the like, new and useful cone-bearings especially adapted for the reel, or other parts if desired, the same having means of adjustment without the removal of any of the parts; various adjusting means for limiting the upward movement of the relatively stationary cutter-bar; means for alining the cutter-bar with relation to the blades of the reel, the same being located at either one or both ends of the machine; the self-alining washers by which certain of the parts will be self-adjusted and centered; and various other details which will be brought out in the course of this specification.

Other minor objects and particular advantages of this invention will be made apparent by the following description, and that which is new and useful will be correlated in the appended claims.

The preferred means for producing the various new and useful features of my present invention are shown most clearly in the accompanying two sheets of drawings, in which—

Figure 1:
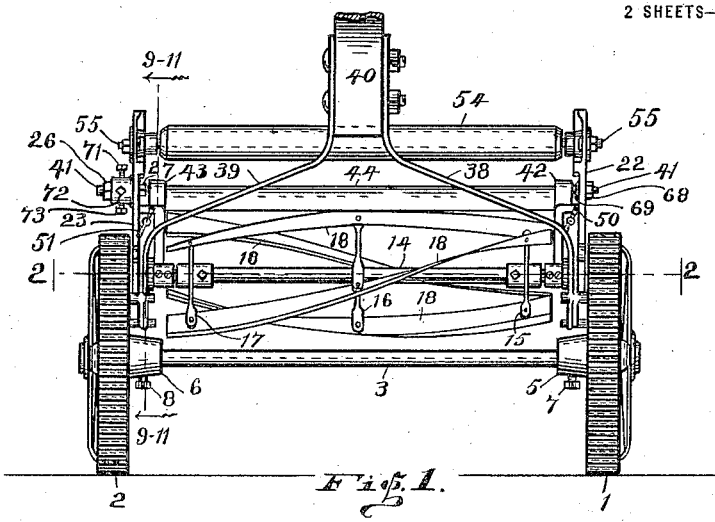
Figure 2:
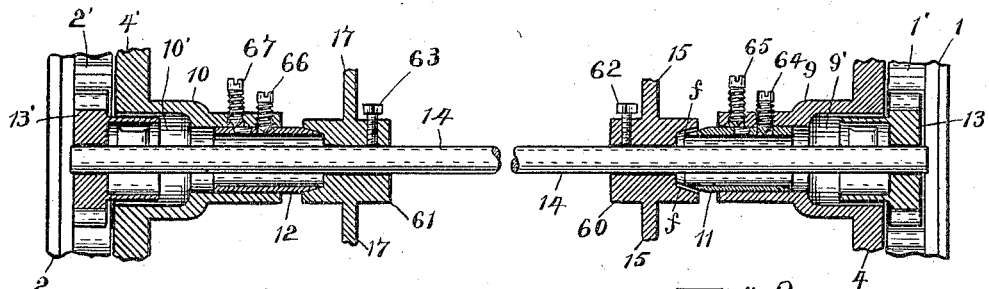
Figure 3:
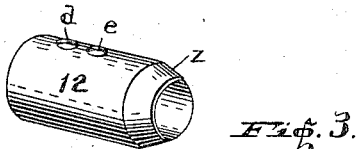
Figure 4:
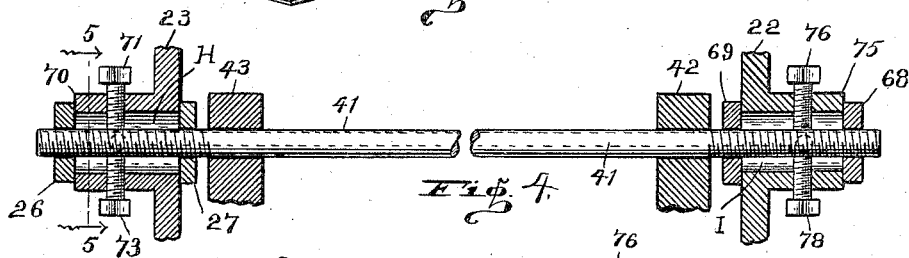
Figure 5:
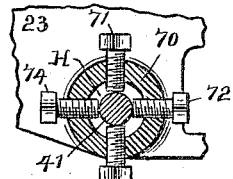
Figure 6:
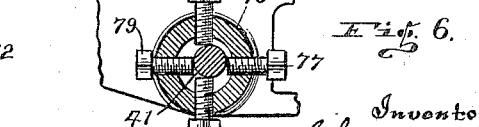
Figure 7:
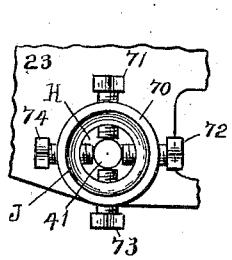
Figure 8:
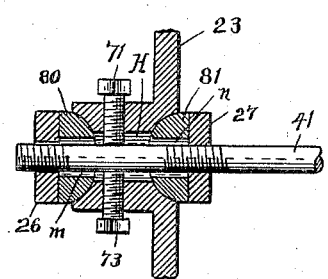
Figure 9:
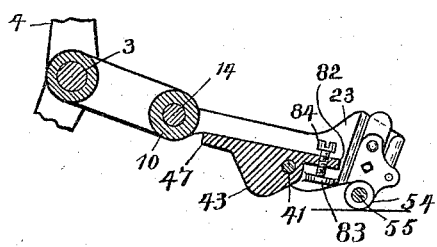
Figure 10:
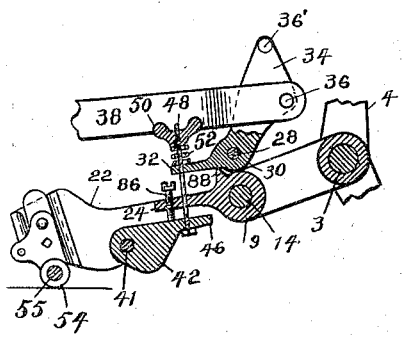
Figure 11:
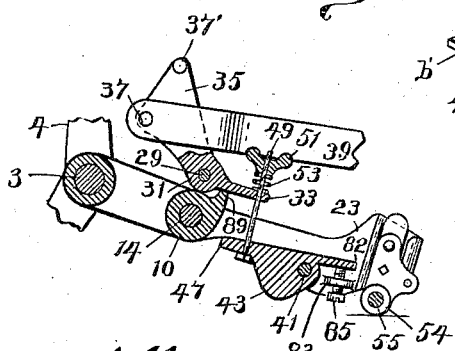
Figure 13:
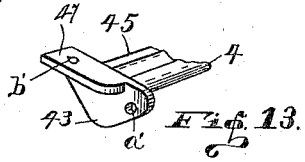
Figure 12:
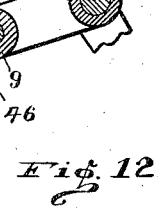
Figure 14:
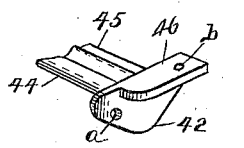

Figure 1 is a plan view of a lawn mower in which the various new and useful features are incorporated and showing the alining means for the cutter-bar at one end only. Fig. 2 is an enlarged longitudinal view of the reel-shaft, together with portions of the neighboring parts in vertical section, as taken on the line 2—2 of Fig. 1, showing the cone-bearings for the reel-shaft, and the means for the adjustment of said cones. Fig. 3 is a perspective view of one of the cone bearings alone. Fig. 4 is a longitudinal elevation of the relatively stationary cutter-bar rod, in which the neighboring parts are shown as in vertical section, and showing the means for adjusting said rod at either one or both of its ends. Fig. 5 is an elevation of a portion of the outer face of one of the frame-plates, showing in vertical section the collar or boss which is integral therewith, also showing, in section, the rod with the means for its adjustment with the collar or boss, the rod and said collar or boss being taken as slightly inward from the line 5—5 of Fig. 4. Fig. 6 is an elevation of a portion of the outer face of one of the frame-plates, being the one on the opposite side of the machine from that shown in Fig. 5, showing in vertical section the collar or boss which is integral therewith, also showing in section the shaft which is located eccentrically, and showing the means for locking said shaft in position. Fig. 7 is an end elevation of the parts shown in Figs. 5 and 6, the outer retaining nut of the rod removed, showing a raceway in the end of said boss in which a compensating or self alining washer may be seated. Fig. 8 is a detail longitudinal section, taken at right-angles to Fig. 7, showing the adjusting means, and also showing the said self alining washers and the means for retaining them in their raceways. Fig. 9 is a cross section, showing certain parts, as taken on the line 9—11 of Fig. 1, showing one means for limiting the upward movement of the blade of the cutter-bar. Fig. 10 is a cross section showing certain parts as taken through the corresponding parts on the opposite side of the machine from that shown in Fig. 9, showing in addition thereto the tension means for normally retaining the cutter-bar in proper relation to the blades of the reel, but primarily showing a second means for limiting the upward movement of the blade of the cutter-bar. Fig. 11 is similar to Fig. 10, differing only in that it shows the corresponding parts on the opposite side of the machine, and primarily showing a third means for limiting the upward movement of the blade of the cutter-bar. Fig. 12 is similar to Fig. 9, differing only in that it shows the corresponding parts on the opposite side of the machine, and primarily showing a fourth means for limiting the upward movement of the blade of the cutter-bar. Fig. 13 is a perspective detail of one end portion of the cutter-bar and the parts related thereto and Fig. 14 is a perspective detail of one end portion of the cutter-bar opposite to that shown in Fig. 13.

Similar indices denote like parts throughout the several views.

In order that the construction, the operation, and the advantages of my invention may be properly understood and appreciated, I will now take up a detailed description thereof, in which I will set forth the invention as comprehensively as I may.

In the drawings numerals 1 and 2 designate the two bull-wheels of the mower, the same being spaced apart and connected by the supporting shaft or rod 3. The inner peripheries of the bull-wheels are provided with gears 1' and 2', respectively. The frame of the mower comprises the two disks 4 and 4', which are located inside the inner edges of the respective bull-wheels, with which they are concentric, and said disks are rigidly connected to the shaft 3 by means of inwardly extending hubs 5 and 6, which hubs engage around the shaft 3, where they are secured by the respective set-screws 7 and 8, or they may be otherwise secured thereto if desired.

Extending inward toward each other from near the peripheries of the disks 4 and 4' are the respective sleeves 9 and 10, which have the respective apertures 9' and 10' formed horizontally therethrough in an axial direction, and said apertures continue out through the respective disks 4 and 4', as shown in Fig. 2.

Slidable longitudinally through the apertures 9' and 10', and fitting snugly therein, are the respective cones or bearing members 11 and 12, the inner ends of which are formed tapering or beveled, as shown at $z$ in Fig. 3. Extending across through both of the cone bearings 11 and 12 and spaced therefrom is the reel-shaft 14, which is of less diameter than the diameter of the interior of the cones.

Secured on the ends of the reel-shaft are the pinions 13 and 13' which mesh with the respective gears 1' and 2', in the usual manner.

The reel comprises the shaft 14, the spiders 15, 16 and 17, and the spiral blades 18.

Numerals 22 and 23 denote the frame plates which are integral with the respective disks 4 and 4' and the sleeves 9 and 10, and they extend rearward from said sleeves. Extending back from the sleeves 9 and 10, integral therewith and with the inner faces of the frame-plates 22 and 23 are tongues as the tongue 24, shown in Figs. 10 and 12, respectively, whose purpose will hereinafter be made clear, and they are employed only with certain of the means for limiting the upward movement of the blade of the cutter-bar. Extending inward from the disks 4 and 4', at points above the shaft 14, are the respective pivots 28 and 29. Rotatably mounted on each of the said pivots is a dog, each comprising a hub, 30 and 31 respectively; a tongue, 32 and 33 respectively; and a plate, 34 and 35 respectively. Extending inward from the two upper corners of the plate 34 are the studs 36 and 36'; and, likewise, extending inward from the two upper corners of the plate 35 are the studs 37 and 37'. Mounted on the pivot 36 is the handle-iron 38; and mounted on the pivot 37 is the handle-iron 39. The said handle-irons extend back and then centerward toward each other, with their rear portions secured to the handle 40. The function of the studs 36' and 37' is merely to limit the upward movement of the handle, as the respective handle-irons may engage therewith when the handle is raised upward to its limit. Extending across between the plates 22 and 23 is the cutter-bar rod 41, on which is rotatably mounted the end end-blocks 42 and 43 of the cutter-bar. The rod 41 passes through apertures $a$ and $a'$ formed through the respective end blocks, as shown in Figs. 13 and 14. Integrally connecting the end blocks 42 and 43 is the cutter-bar 44, which has secured to the front edge thereof the blade 45, with which the blades 18 are adapted to coöperate in shearing relation. It is to be understood that I am not to be limited to the employment of a rod 41 extending across between the plates 22 and 23, as it is evident that other equivalent means may be employed to answer the same purpose, that is for rotatably supporting the cutter-bar 44.

Extending outward from the ends 42 and 43 are the respective tongues 46 and 47, through each of which is an aperture, $b$ and $b'$ respectively, through which apertures are disposed the respective upwardly extending bolts 48 and 49, each having a head on its lower end, and having the respective thumb-nuts 50 and 51 threaded on their upper portions. The bolt 48 extends up through the tongue 46, and through an aperture in the tongue 32; and the bolt 49 extends up through the tongue 47, and through an aperture in the tongue 33. Disposed around the bolt 48, between the nut 50 and the tongue 32, is the spring 52; and located around the bolt 49, between the nut 51 and the tongue 33, is the spring 53. The said springs, 52 and 53, are adapted to resiliently retain the blade 45 normally upward to the limit of its movement, which limit may be varied as desired, as hereinafter set forth.

Adjustably mounted to the rear portion of the frame plates 22 and 23, and extending therebetween, is the shaft 55 on which is mounted the ground roller 54, by which the rear of the machine is supported, in order to carry the blade 45 the proper distance above the ground over which the mower travels.

The spiders 15 and 17 each have a central hub, 60 and 61 respectively, through which extends the shaft 14 concentric therewith and secured thereto by the respective setscrews 62 and 63. The outer ends of the hubs 60 and 61 are formed concave, or cupshaped, to provide raceways, as shown at $f$ in Figs. 2 and 3, in order to receive therein the beveled or tapered ends of the respective cone bearings 11 and 12, as shown. The cones 11 and 12 are adapted to be retained in position, and also prevented from rotating, each by a pair of taper-pointed setscrews, 64—65 and 66—67 respectively. Each of said screws is adapted to enter an aperture therefor formed in the cones, there being two of such apertures in each cone, as the apertures $e$ and $d$ shown in Fig. 3. The members of each pair of apertures are located nearer together than are the corresponding members of each pair of screws, for the reason that I will state: It will be noticed that the cone 11 is not properly seated in the cup $f$ to form a bearing, therefore if the screw 64 be run up to free it from the cone, then as the screw 65 is run down it will force the cone 11 inward, thereby bringing it in proper relation to the cup $f$, that is to the position of the cone 12 at the left in Fig. 2. It is evident that a reversal of the operations just stated will move the cone outward, that is to say,—by running the screw 66 up, and then running the screw 67 down it is evident that the cone 12 will be moved outward, that is to the position of the cone 11.

It is evident that any degree of adjustment may be had between the limits of that of cone 11 to that of cone 12 as they are shown in Fig. 2.

Referring now, more particularly, to Figs. 4, 5 and 6, I will describe the means for alining the cutter-bar, or its blade, with relation to the blades 18 of the reel. Now as the cutter-bar is mounted on the rod 41 it is evident that an adjustment of the rod 41 will eventuate in adjusting the cutter-bar and its blade, this being accomplished by simply adjusting one end, as suggested in Fig. 1, whereby one end of the rod 41 is rigidly secured, as by the nuts 68 and 69, which nuts are threaded on the right-hand portion of the rod 41 and are tightened directly against the outer and the inner face, respectively, of the frame-plate 22. Through the plate 23 a large aperture H is formed for the rod 41 to pass through, and extending out from the plate 23 with its interior registering with said aperture H, is the boss 70, which is, preferably, integral with the plate 23. Two threaded apertures are formed entirely across through the boss 70, at right-angles to each other, and also at right angles with relation to the rod 41, thereby forming, in fact, four apertures piercing the wall of the boss 70 and which are directed toward a common center in the aperture H, which latter continues out through the base 70 as shown. Directed inward from the outer termini of the said threaded apertures formed across through the boss 70 are the set-screws 71, 72, 73 and 74. The inner ends of said set-screws are adapted to engage the rod 41 and to hold it tightly in place, either concentric or eccentric with the aperture H, as shown respectively in Figs. 5 and 6. By this means I am enabled to move one end of the rod 41 to such position as will bring the shaft rod into absolute alinement with the reel, thereby alining the blade of the cutter-bar with the blades of the reel.

In some instances I find it of advantage that both ends of the rod 41 be made adjustable, as is shown in Fig. 4, which I accomplish in a like manner, or similar, to that above described, in which instance a large aperture I is formed for the rod 41 through the plate 22. Then extending out from the plate 22 with its interior registering with said aperture I, is a boss 75 which is integral with the plate 22. Two threaded apertures are formed entirely across through the boss 75, at right-angles to each other and also at right-angles with relation to the rod 41, thereby forming, in fact, four threaded apertures piercing the wall of the boss 75 and directed toward a common center in the aperture I, the said aperture I continues out through the boss 75, as shown. Directed inward from the outer termini of the said threaded apertures, formed across through the boss 75, are the set-screws 76, 77, 78 and 79. The inner ends of said set-screws are adapted to engage the rod 41 and retain it rigidly in place, either concentric or eccentric with the aperture I, as shown in Figs. 5 and 6.

After the right-hand end of the rod 41 has been adjusted, as set forth, it may be locked by the nuts 68 and 69, the former contacting with the outer end of the boss 75 and the latter with the inner face of the plate 22, substantially as shown in Fig. 4. In like manner to the above the left-hand end of the rod 41 may be adjusted, as set forth, and then locked by means of the nuts 26 and 27, the former contacting with the outer end of the boss 70 and the latter with the inner face of the plate 23.

In some instances the inner or contact faces of the nuts 26, 27, 68 and 69 do not properly contact with the parts with which they engage, thereby resulting in distorting certain of the parts, particularly the rod 41, therefore in order to overcome this difficulty I provide self alining or compensating washers, to be employed with either one or both ends of the rod, and, if preferred, on both sides of the adjusting means above described, as shown in Fig. 8.

Numerals 80 and 81 designate two of my self alining washers, however, when desired, but one of said washers may be employed in place of the dual arrangement shown in Fig. 8, in which instance the two washers are oppositely disposed with relation to each other. The said washers should be made of comparatively thick material, and their contact or working faces are formed rounding, as the segment of a sphere, in order to fit in the cup-like sockets formed therefor around the termini of the aperture H (or I) and concentric with said apertures, as for instance the socket J shown in Fig. 7, the said sockets being indicated in cross section in Fig. 8. Central apertures m and n, are formed through the washers 80 and 81 respectively, which apertures are of greater diameter than is the diameter of the rod 41 which passes therethrough. Now by employing the washers 80 and 81 between the nuts 26 and 27, respectively, it will be seen that although the nuts may not be true that nevertheless the washers will easily compensate therefor, as they turn slightly in their sockets as pressure is applied thereto, therefore the alinement of the parts will be preserved.

A very important feature of this invention is the means I employ to regulate and fix the limit of action of the cutter-bar and its blade with relation to the blades of the reel. This desideratum may be accomplished in a variety of ways, certain of which are shown in Figs. 9, 10, 11 and 12, which I will now describe.

First, as shown in Fig. 9, this is accomplished by extending the upper portion of the ends 42 and 43 rearward, forming tails, as at 82. Numeral 83 denotes an ear or lug extending inward from the plate 23 and located a short distance below the tail 82. A set-screw 84 is threaded down through the tail 82, with its point adapted to engage the ear 83, therefore the limit to which the blade 45 of the cutter-bar may be raised will depend upon the position of the set-screw 84.

Second, as shown in Fig. 10, the same result may be accomplished by employing a set-screw 86, which is threaded down through the tongue 24, with its point adapted to contact with the tongue 46, in a position forward of the rod 41.

Third, the arrangement shown in Fig. 11 is similar to that shown in Fig. 9, except that a set-screw 85 is threaded upward through the ear 83, with the point of said set-screw adapted to engage the underside of the tail 82, thereby providing means for limiting the upward movement of the blade 45. And, fourth, as shown in Fig. 12, the set screw 87 is threaded upward through the tongue 46, with its point adapted to engage the underside of the tongue 24, thereby limiting the upward movement of the blade 45.

As shown in Figs. 10 and 11, I provide means for limiting the downward movement of the tongues 32 and 33 as the springs 52 and 53 press against them, the said means comprise the respective lugs 88 and 89 which extend upward from the respective sleeves 9 and 10, and therefore they are rigid with relation to the frame of the machine.

Various other modifications of the above might be employed, the main desideratum, however, being to provide efficient means for limiting the upward movement of the cutter-bar blade and for adjusting such limit as desired.

From the above it may be observed that in the first instance, that is, when the mower is being manufactured, or after the blades have become worn, that the proper shearing relation between the blade 45 and the blades 18 may be obtained by running the set-screws 84 or 86 upward, or by running the set-screws 85 or 87 downward, thereby changing the upward limit of movement of the blade 45, but still permitting the blade 45 to spring downward resiliently away from the blades 18, when occasion requires, and the springs 52 and 53 always tend to return the blade 45 to the position it has been adjusted to with relation to the blade 18, by means of the set-screws 84, 85, 86, or 87, or a combination thereof. The tension by which the cutter-bar, or the blade 45, is returned upward may be varied by turning the thumb-nuts 50 and 51 up or down, as desired.

It will be noticed that in propelling the mower, by pushing upon the handle 40, that a cushioning effect will be attained upon the springs 52 and 53, its extent being governed by the tension of the springs 52 and 53.

In the assembling, and in the repair, of lawn mowers, one of the greatest difficulties is in properly alining the cutter-bar, or its blade, with relation to the reel, but with my invention all that is required is to loosen certain of the set-screws carried by the boss 70, or the boss 75, and then tightening certain others of the said set-screws until the proper position of the rod 41 is attained, as suggested in Figs. 5 and 6.

The function of the self-alining washers has already been set forth, and in practice these will materially assist in retaining the rod 41 in proper position.

Each of the means for alining the upward movement of the cutter-bar, or the blade 45, shown in Figs. 9, 10, 11 and 12, may be the same at each end of the cutter-bar, or a combination of these means may be employed if desired. Any one of these means makes the adjustment of the cutter-bar very simple and accurate, and very easily and quickly accomplished.

I would have it understood that various changes may be made in the size, shape, and the relative location of the several parts, and in the several details of construction, from that herein shown and described, without departing from the spirit of my invention and without sacrificing any of the advantages thereof.

Having now fully shown and described my invention, and the best means for carrying out the same to me known at this time, what I claim, and desire to secure by Letters Patent of the United States, is—

1. In combination with a lawn mower having a frame including side plates, a reel having cutting blades revolubly mounted between said plates, a non-rotatable rod extending through and between the side plates, and adapted to be moved sidewise universally and independently thereof, a cutter-bar rotatably mounted at its rear portion on said rod and extending between said plates, means whereby said rod may be adjusted universally to aline the cutter-bar carried thereby with relation to the blades of the reel, and means for rigidly securing said rod in its adjusted position, all substantially as shown and described.

2. In combination with a lawn mower comprising a frame having side plates, a reel having cutting blades revolubly mounted between said plates, a non-rotatable rod extending through and between said plates, a cutter-bar rotatably mounted at its rear portion on said rod and extending between said plates, means for alining the cutter-bar with relation to the blades of the reel, said means comprising a boss having a comparatively large aperture therethrough in an axial direction and projecting outward from and integral with a side plate, a plurality of set-screws threaded through the wall of said boss at right-angles to said rod and adapted to impinge said rod to retain the rod concentric or eccentric with said aperture.

3. In combination with a lawn mower comprising a frame having side plates, a reel having cutting blades revolubly mounted between said plates, a non-rotatable rod extending through apertures therefor in the side plate, a cutter-bar rotatably mounted on said rod and extending between the side plates, a hollow boss extending out from the side plate and concentric with said aperture in the side-plate through which passes said rod, the latter being extended through the boss, a plurality of set screws threaded through the wall of the base with their points adapted to contact with said rod, and nuts threaded on said rod and adapted to retain the rod in adjusted position, all substantially as shown and described.

4. In combination with a lawn mower having a side plate with a large aperture therethrough, a boss formed integral with said plate and extending out concentric with said aperture in the plate, a rod of less diameter than said aperture disposed through said boss, set-screws threaded through the wall of the boss with their points directed toward the center of the boss and adapted to impinge said rod which extends therethrough, nuts threaded on said rod and adapted to contact with the inner face of said plate and with the outer end of said boss to lock the rod in its adjusted position, all substantially as shown and described.

5. In combination with a lawn mower having a reel and a side plate, with an aperture through the side plate, a hollow boss projecting out from said plate and having an aperture therethrough registering with said aperture in the plate, a rod of less diameter than said aperture in the plate and the boss and disposed therethrough, set screws inserted through the wall of the boss with their points adapted to contact with said rod for making longitudinal alinement of the cutter-bar with relation to the reel, and means carried by said rod to contact with the inner face of said plate, and means carried by the outer end of said rod to contact with the outer end of the boss to lock the rod in its adjusted position.

In testimony whereof I have hereunto subscribed my name to this specification in the presence of two subscribing witnesses.

JOHN DEO TILLMAN.

Witnesses:
R. E. RANDLE,
ROBT. W. RANDLE.